United States Patent
Vo et al.

(10) Patent No.: US 11,873,108 B2
(45) Date of Patent: Jan. 16, 2024

(54) DROGUE TO SEAT SEPARATION ASSEMBLY HAVING PYROTECHNIC FASTENER

(71) Applicant: AMI INDUSTRIES, INC., Colorado Springs, CO (US)

(72) Inventors: Bang H. Vo, Wichita, KS (US); Steve Holstine, Peyton, CO (US)

(73) Assignee: AMI INDUSTRIES, INC., Colorado Springs, CO (US)

(*) Notice: Subject to any disclaimer, the term of this patent is extended or adjusted under 35 U.S.C. 154(b) by 185 days.

(21) Appl. No.: 17/478,432

(22) Filed: Sep. 17, 2021

(65) Prior Publication Data

US 2023/0088613 A1    Mar. 23, 2023

(51) Int. Cl.
*B64D 25/10*    (2006.01)
*B64D 17/72*    (2006.01)

(52) U.S. Cl.
CPC ........... *B64D 25/10* (2013.01); *B64D 17/725* (2013.01)

(58) Field of Classification Search
CPC .... B64D 25/10; B64D 17/725; B64D 17/386; F16B 31/005; F16D 9/00; B64C 27/68
See application file for complete search history.

(56) References Cited

U.S. PATENT DOCUMENTS

| | | | |
|---|---|---|---|
| 3,012,810 A * | 12/1961 | Tenney | F42B 3/006 89/1.14 |
| 3,084,597 A | 4/1963 | Beyer | |
| 3,237,521 A * | 3/1966 | Francis | F42B 3/006 411/440 |
| 3,378,218 A | 4/1968 | Robertson et al. | |
| 3,624,813 A * | 11/1971 | Gaylord | B64D 17/22 24/603 |
| 4,709,885 A * | 12/1987 | Martin | B64D 17/72 244/141 |
| 5,297,761 A | 3/1994 | Kendall, Jr. et al. | |
| 5,362,016 A * | 11/1994 | Aronne | B64D 17/58 244/122 AE |
| 7,375,277 B1 * | 5/2008 | Skinner | B23P 9/025 29/523 |
| 8,313,063 B2 * | 11/2012 | Fox, Jr. | B64D 17/383 244/151 B |
| 10,989,243 B2 * | 4/2021 | Thomas | F16B 31/005 |

* cited by examiner

*Primary Examiner* — Medhat Badawi
*Assistant Examiner* — Vicente Rodriguez
(74) *Attorney, Agent, or Firm* — SNELL & WILMER L.L.P.

(57) ABSTRACT

A drogue bridle separation assembly may comprise a housing and a pyrotechnic fastener. The housing may define a riser channel and a fastener opening. The pyrotechnic fastener may be configured to extend through the fastener opening and the riser channel. The pyrotechnic fastener includes a charge configured to undergo an exothermic reaction in response to an electrical signal.

10 Claims, 7 Drawing Sheets

DROGUE TO SEAT SEPARATION ASSEMBLY HAVING PYROTECHNIC FASTENER

FIELD

The present disclosure relates to ejection seats, and more specifically, to drogue to seat separation assemblies having pyrotechnic fasteners and methods of installing and retaining drogue parachutes in ejection seats.

BACKGROUND

During ejection events, an ejection seat may be propelled from an aircraft cockpit. The ejection seats may include parachute systems configured to reduce the velocity of the ejection seat and its occupant and deliver the seat and/or the occupant safely to land or sea. The parachute systems may include a drogue parachute, which may deploy rapidly in response to expulsion of the ejection seat from the cockpit. The drogue parachute may decelerate and stabilize the ejection seat to enable safe deployment of a main parachute.

The drogue bridle attaches the drogue parachute to the ejection seat. A predetermined time after deployment of the drogue parachute, a severance cutter is initiated to sever the drogue bridle, thereby releasing the drogue parachute from the ejection seat. Current drogue severance cutters may not be certified to sever certain material(s) such as, for example, aramid fiber (e.g., KEVLAR®). Additionally, the manufacture of the severance cutter housing and installation of the severance cutter on the ejection seat tend to be time consuming and/or labor intensive processes.

SUMMARY

A drogue bridle separation assembly is disclosed herein. In accordance with various embodiments, the drogue bridle separation assembly comprises a housing and a pyrotechnic fastener. The housing defines a riser channel and a fastener opening. The pyrotechnic fastener is configured to extend through the fastener opening and the riser channel. The pyrotechnic fastener includes a charge configured to undergo an exothermic reaction in response to an electrical signal.

In various embodiments, a bushing is configured to be received in the riser channel. The bushing defines a fastener channel configured to receive the pyrotechnic fastener. In various embodiments, the pyrotechnic fastener includes a fastener body, and the fastener body defines a chamber configured to receive gas produced by the exothermic reaction.

In various embodiments, the pyrotechnic fastener is configured to sever in a first region of the fastener body and in a second region of the fastener body in response to the exothermic reaction. In various embodiments, the first region corresponds to a first end of the bushing, and the second region corresponds to a second end of the bushing.

In various embodiments, a first length of a central portion of the fastener body is approximately equal to a second length of the bushing. The first length of the central portion of the fastener body is measured between the first region and the second region. The second length of the bushing is measured between a first end of the bushing and a second end of the bushing.

In various embodiments, the first region includes a first groove formed in at least one of an exterior surface of the fastener body or an interior surface of the fastener body. The second region includes a second groove formed in at least one of the exterior surface or the interior surface.

In various embodiments, the first region of the fastener body is formed of a first material, and wherein the central portion of the fastener body is formed of a second material different from the first material. The second region is formed of a third material. The third material is different from the second material.

In various embodiments, the first region of the fastener body comprises a first density and the central portion of the fastener body comprises a second density. The first density is less than the second density. The second region comprises a third density. The third density is less than the second.

An ejection seat is also disclosed herein. In accordance with various embodiments, the ejection seat comprise a seatback and a drogue canopy stowed, at least partially, in an interior of the seatback. A bridle riser is coupled to the drogue canopy and the seatback A bushing is located in a loop formed by an end of the bridle riser. A pyrotechnic fastener is located in the bushing.

In various embodiments, the pyrotechnic fastener includes a charge configured to undergo an exothermic reaction in response to an electrical signal. In various embodiments, a sequencer is configured to send the electrical signal to the pyrotechnic fastener.

In various embodiments, a housing is coupled to the seatback. The pyrotechnic fastener is coupled to the housing. In various embodiments, the pyrotechnic fastener includes a fastener body. The pyrotechnic fastener may be configured to sever in a first region of the fastener body and in a second region of the fastener body in response to the exothermic reaction.

In various embodiments, a first length of a central portion of the fastener body is approximately equal to a second length of the bushing. The first length of the central portion of the fastener body is measured between the first region and the second region. The second length of the bushing is measured between a first end of the bushing and a second end of the bushing.

In various embodiments, the first region includes a first groove formed in at least one of an exterior surface of the fastener body or an interior surface of the fastener body, and the second region includes a second groove formed in at least one of the exterior surface or the interior surface.

A method for installing a drogue parachute in an ejection seat is also disclosed herein. In accordance with various embodiments, the method comprises the step of locating a bushing coupled to an end of a drogue bridle riser in a riser channel defined by a housing coupled to a seatback of the ejection seat, locating a pyrotechnic fastener through the bushing and the housing, and electrically connecting the pyrotechnic fastener to a sequencer of the ejection seat.

In various embodiments, the method further comprises configuring the sequencer to send a first signal to deploy the drogue parachute and configuring the sequencer to send a second signal to the pyrotechnic fastener a predetermined number of seconds after sending the first signal.

In various embodiments, the method further comprises configuring a fastener body of the pyrotechnic fastener to sever in a first region and in a second region. A first length of the fastener body between the first region and the second region is approximately equal to a second length of the bushing. The second length of the bushing is measured between a first end of the bushing and a second end of the bushing.

In various embodiments, configuring the fastener body to sever in the first region and in the second region comprises forming a first groove in at least one of an exterior surface of the fastener body or an interior surface of the fastener body in the first region, and forming a second groove in at least one of the exterior surface of the fastener body or the interior surface of the fastener body in the second region.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Surface shading lines and/or cross-hatching may be used throughout the figures to denote different parts but not necessarily to denote the same or different materials.

Figure 1:
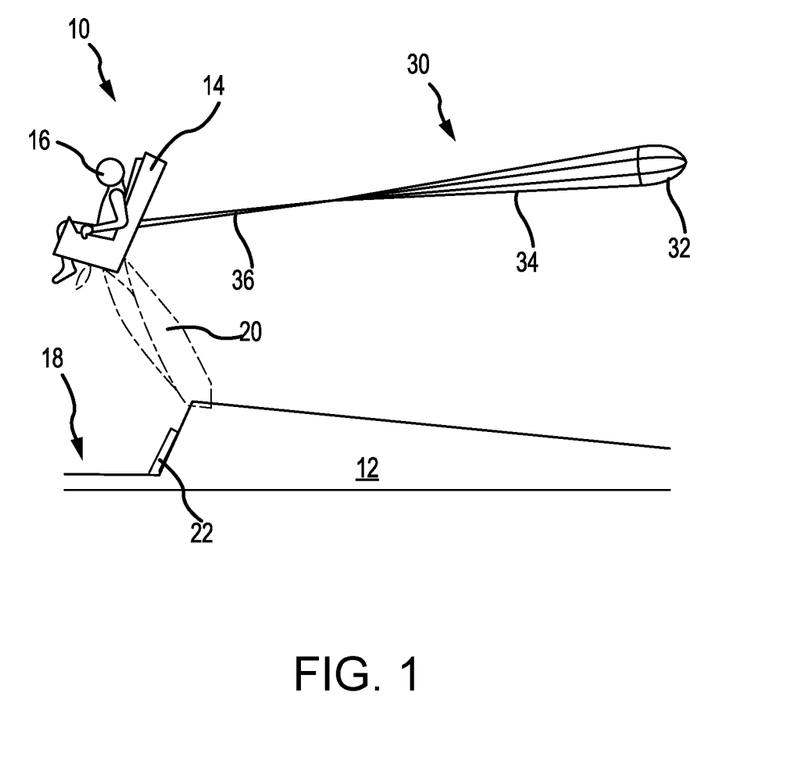
FIG. 1 illustrate deployment of a drogue parachute in response to the expulsion of an ejection seat from an aircraft, in accordance with various embodiments.

With reference to FIG. 1, an aircraft ejection system 10 is shown during deployment of a drogue parachute. In accordance with various embodiments, aircraft ejection system 10 may be installed in an aircraft 12 to expel ejection seat 14 and an occupant 16 of ejection seat 14 from a cockpit 18 of aircraft 12. Ejection seat 14 may be urged from cockpit 18 by a propulsion system 20.

In accordance with various embodiments, ejection seat 14 includes a drogue parachute 30. Drogue parachute 30 includes a drogue canopy 32, suspension lines 34, and a bridle 36. Suspension lines 34 are attached to drogue canopy 32. Bridle 36 is attached to suspension lines 34 and to ejection seat 14. In this regard, bridle 36 couples drogue canopy 32 to ejection seat 14. Drogue canopy 32 is configured to deploy from ejection seat 14. For example, drogue canopy 32 may deploy a predetermined time after initiation of the ejection sequence (e.g., after an ejection handle is pulled) and/or in response to another ejection event (e.g., in response to ejection seat 14 traveling over a switch located on a rail 22 in cockpit 18).

Figure 2:
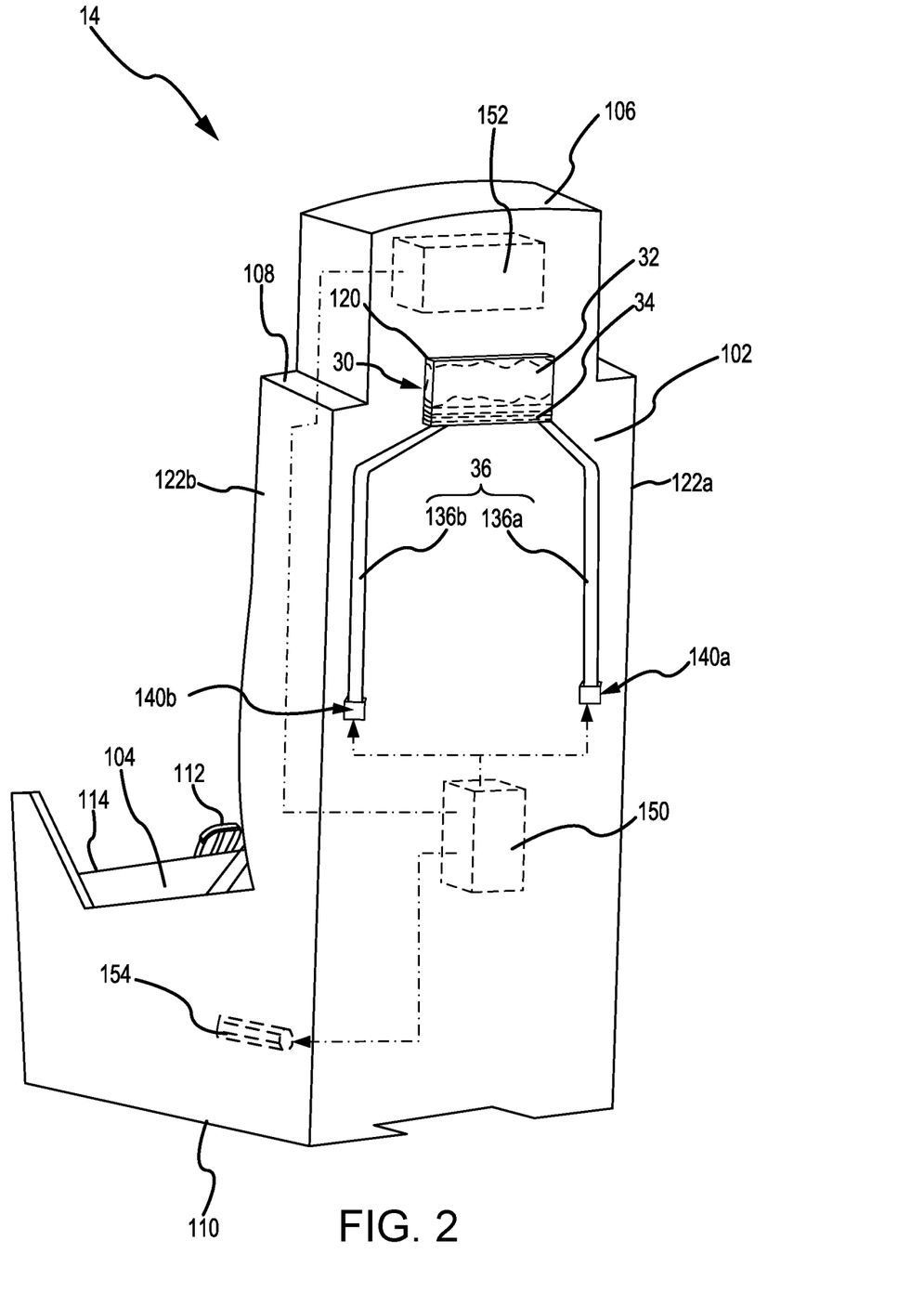
FIG. 2 illustrates a perspective view of a drogue parachute assembly stowed in an ejection seat seatback, in accordance with various embodiments.

With additional reference to FIG. 2, ejection seat 14 is illustrated with drogue parachute 30 in the stowed position. In accordance with various embodiments, ejection seat 14 includes a seatback 102 and a seat pan 104. A headrest 106 may be located at an upper end 108 of seatback 102. In various embodiments, an ejection handle 112 may be located proximate a front side 114 of seat pan 104. Front side 114 of seat pan 104 is generally opposite, or distal, seatback 102. While FIG. 2 shows ejection handle 112 located at front side 114 of seat pan 104, it is further contemplated and understood that ejection handle 112 may be located anywhere that is accessible to occupant 16 of ejection seat 14. Ejection handle 112 may be configured to initiate an ejection sequence upon actuation. For example, seat occupant 16 pulling ejection handle 112 may cause ejection seat 14 to be expelled from aircraft 12.

Ejection seat 14 includes drogue parachute 30. Drogue parachute 30 may be stowed within an interior of seatback 102. Stated differently, prior to deployment, drogue canopy 32 and suspension lines 34 may be stowed in a storage volume 120 in seatback 102. While storage volume 120 is illustrated as located proximate upper end 108 and headrest 106, it is contemplated that drogue canopy and suspension lines 34 may be stowed and deploy from other locations along seatback 102.

In accordance with various embodiments, a right (or first) riser 136a of bridle 36 and a left (or second) riser 136b of bridle 36 are coupled to ejection seat 14. Right riser 136a and left riser 136b each extend from drogue storage volume 120 to a respective bridle separation assembly. For example, right riser 136a is coupled to ejection seat 14 via a right drogue bridle separation assembly 140a and left riser 136b is coupled to ejection seat 14 via a left drogue bridle separation assembly 140b. Right riser 136a extends between storage volume 120 and right drogue bridle separation assembly 140a. Right riser 136a may be coupled (e.g. tacked) to seatback 102 proximate right sidewall 122a. Left riser 136b extends between storage volume 120 and left drogue bridle separation assembly 140b. Left riser 136b may be coupled (e.g. tacked) to seatback 102 proximate left sidewall 122b.

In accordance with various embodiments, and as described in further detail below, each of the right and left drogue bridle separation assemblies 140a, 140b includes a pyrotechnic fastener (e.g., an explosive bolt). The pyrotechnic fastener couples an end of the bridle riser 136a, 136b to the ejection seat 14. The pyrotechnic fastener is configured to detonate in response to receiving an electrical signal, thereby releasing its respective the bridle riser 136a, 136b from the ejection seat 14.

In various embodiments, the electrical signal may be sent to the pyrotechnic fastener from a sequencer 150 of ejection seat 14. Sequencer 150 may be configured to control the timing sequence and deployment of one or more ejection subsystem of ejection seat 14. For example, sequencer 150 may control the deployment of drogue parachute 30, of a main parachute 152, of an occupant restraint release system 154, and/or any other ejection subsystem of ejection seat 14.

Figure 3A:
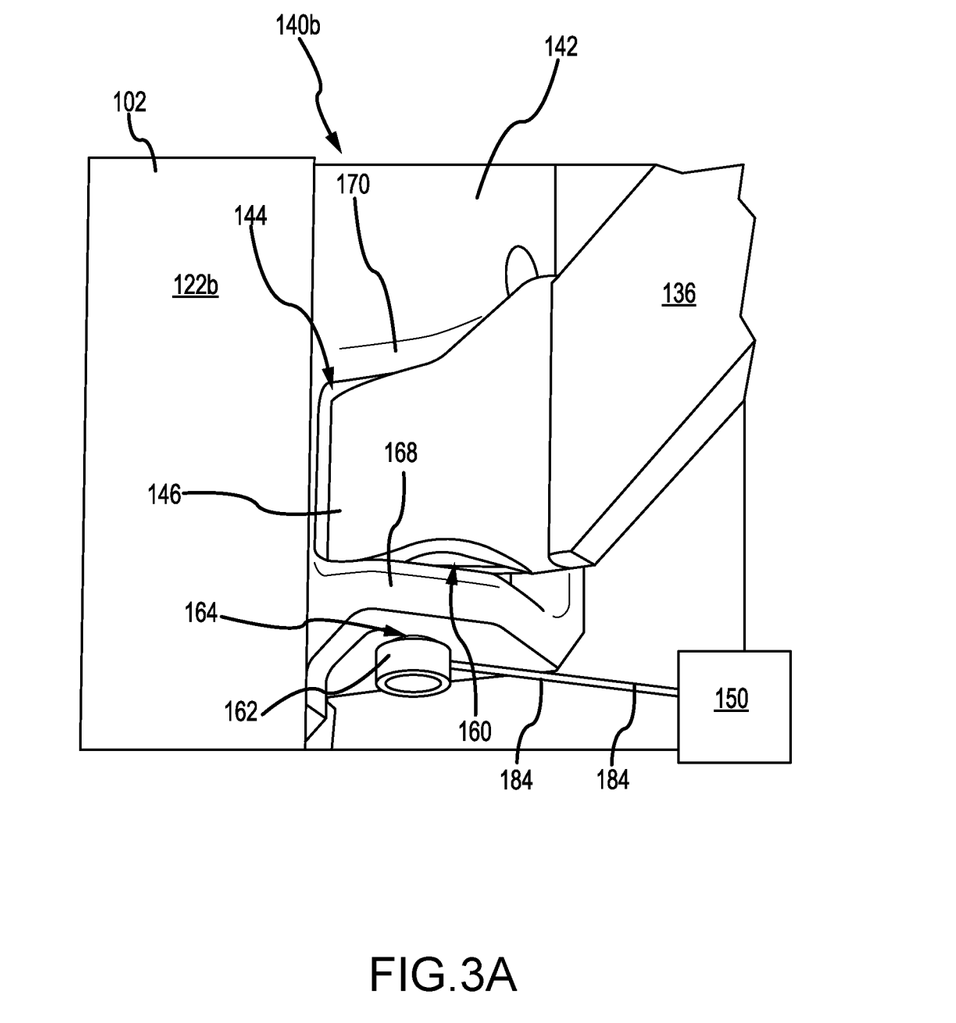
FIGS. 3A and 3B illustrate a perspective view and a cross-section view, respectively, of a drogue bridle separation assembly having a pyrotechnic fastener, in accordance with various embodiments.
Figure 3B:
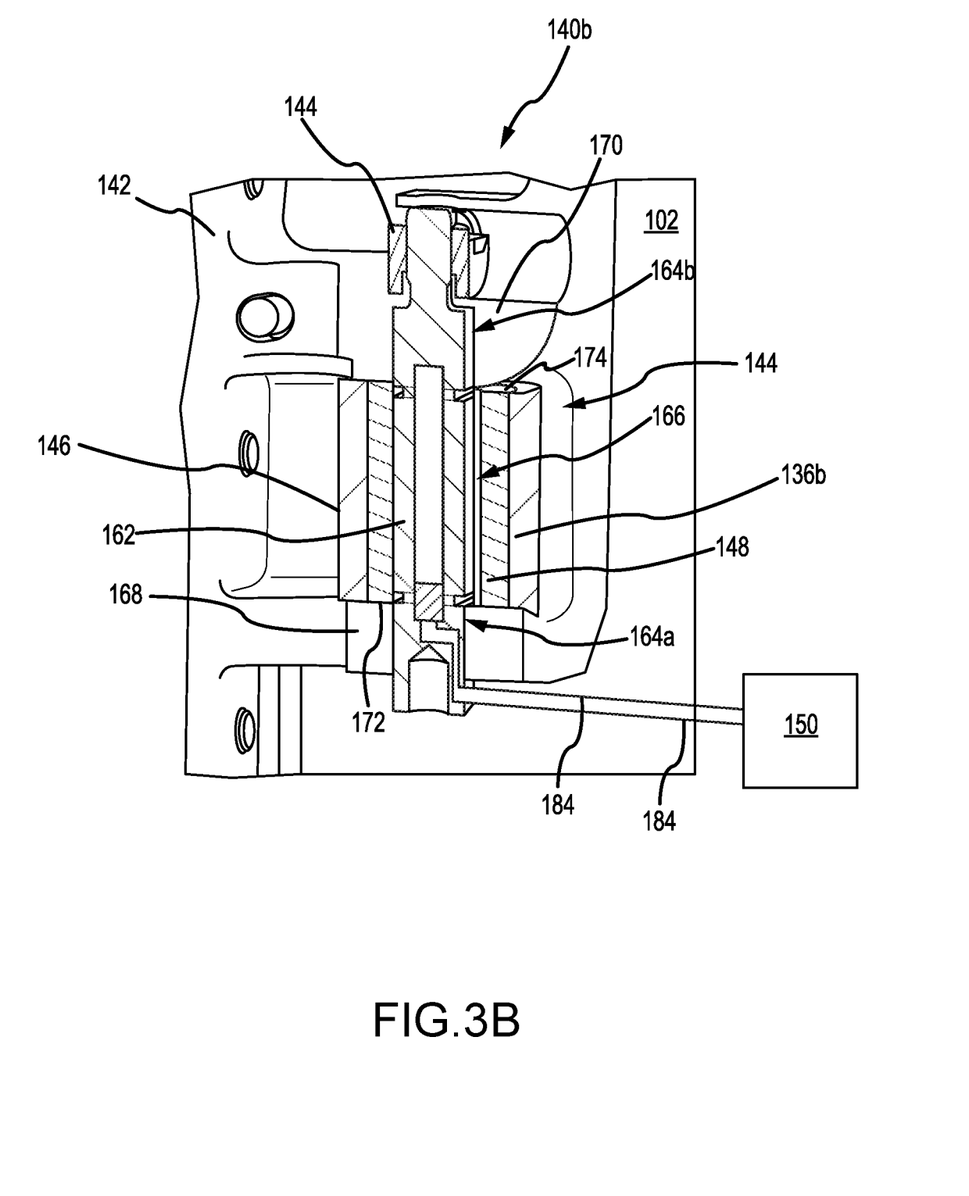

With reference to FIGS. 3A and 3B, additional details of left drogue bridle separation assembly 140b and left riser 136b are illustrated. While FIGS. 3A, 3B, 5A, and 5B illustrate features and functionalities of left drogue bridle separation assembly 140b and left riser 136b, it is contemplated and understood that right drogue bridle separation assembly 140a and right riser 136a, with momentary reference to FIG. 2, are mirror images of left drogue bridle separation assembly 140b and left riser 136b, respectively. In this regard, right drogue bridle separation assembly 140a and right riser 136a include the features and functionalities as described herein with reference to left drogue bridle separation assembly 140b and left riser 136b, respectively.

In accordance with various embodiments, left drogue bridle separation assembly 140b includes a housing 142. Housing 142 may be mounted to seatback 102. For example, housing 142 may be mounted proximate left sidewall 122b. Housing 142 defines a riser channel 144. Riser channel 144 is configured to receive an end 146 of left riser 136b. End 146 is opposite suspension lines 34, with momentary reference to FIG. 1. End 146 of left riser 136b may be coupled to a bushing 148 (FIG. 3B). In this regard, riser channel 144 is configured to receive end 146 and bushing 148. In various embodiments, bushing 148 may be located in a loop 160 (FIG. 3A) formed by end 146 of left riser 136b. Stated differently, end 146 of left riser 136b is located around and may surround bushing 148.

In accordance with various embodiments, left drogue bridle separation assembly 140b includes a pyrotechnic fastener 162 (e.g., an explosive bolt). Pyrotechnic fastener 162 is located through a fastener opening 164 defined by housing 142 and a fastener channel 166 defined by bushing 148. Fastener opening 164 in housing 142 is configured to align with fastener channel 166 in bushing 148. Fastener opening 164 may include a first opening 164a formed through a first flange 168 of housing 142 and a second opening 164b formed through a second flange 170 of housing 142.

With particular reference to FIG. 3B, fastener channel 166 in bushing 148 extends from a first end 172 of bushing 148 to a second end 174 of bushing 148. Second end 174 of bushing 148 is opposite first end 172. First end 172 of bushing 148 is located proximate first flange 168. Second end 174 of bushing 148 is located proximate second flange 170.

Figure 4:
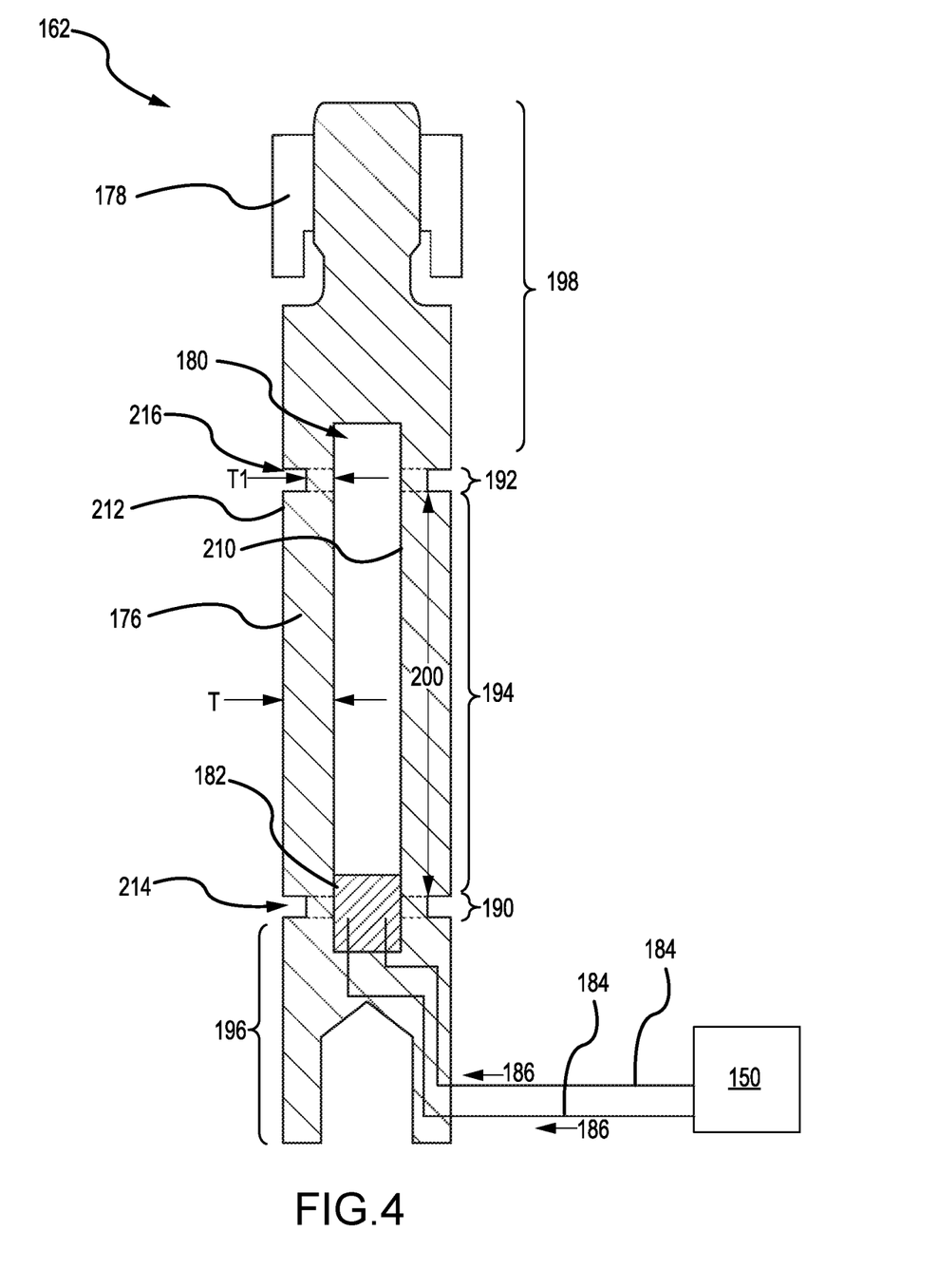
FIG. 4 illustrates a pyrotechnic fastener for a drogue bridle separation assembly, in accordance with various embodiments.

With reference to FIG. 4, additional details of pyrotechnic fastener 162 are illustrated. In accordance with various embodiments, pyrotechnic fastener 162 includes a fastener body 176. A nut 178 may be secured to fastener body 176. In various embodiments, nut 178 may be a barrel nut.

Fastener body 176 defines a chamber 180. Pyrotechnic fastener 162 includes a charge 182. Charge may comprise lead azide, a mixture of boron and potassium nitrate, a mixture of manganese, barium chromate and lead chromate, a mixture of zirconium and potassium perchlorate, or any other suitable gas generator. One or more lead wire(s) 184 is/are electrically coupled to charge 182. Lead wires 184 may be in communication with and/or electrically coupled to sequencer 150 (shown schematically). Charge 182 is an electrically activated pyrotechnic device. Charge 182 is configured to generate a burst of gas in response to receiving an electric signal 186 via lead wire(s) 184. The electrical signal 186 may be sent from sequencer 150. Sequencer 150 may be configured to send the electrical signal 186 a predetermined time after initiation of the ejection sequence. For example, sequencer 150 may send the electrical signal 186 a predetermined number of seconds (e.g. 0.5 seconds, 1 second, 5 seconds, etc.) after sending a deploy signal to drogue parachute 30.

In accordance with various embodiments, in response to receiving the electrical signal 186 from sequencer 150 (FIG. 2), charge 182 combusts (e.g., undergoes an exothermic reduction-oxidation reaction), sending a stream of gas (i.e., the product of the exothermic reduction-oxidation reaction) into chamber 180. The pressure created by the flow of gas into chamber 180 severs (i.e., breaks) fastener body 176, thereby releasing bushing 148, with momentary reference to FIGS. 5A and 5B, and end 146 of left riser 136b from housing 142.

In various embodiments, pyrotechnic fastener 162 is configured to sever in first region 190 and a second region 192 of fastener body 176. With combined reference to FIG. 4 and FIG. 3B, first region 190 of fastener body 176 corresponds to first end 172 of bushing 148. Second region 192 of fastener body 176 corresponds to second end 174 of bushing 148. Severance in first region 190 and in second region 192 separates a central portion 194 of fastener body 176 from a first end portion 196 and a second end portion 198 of fastener body 176. First end portion 196 may comprise a head end of fastener body 176. Second end portion 198 may comprise a threaded surface configured to engage nut 178. In this regard, pyrotechnic fastener 162 is configured to sever such that central portion 194 of fastener body 176 breaks away from the rest of fastener body 176. A length 200 of central portion 194 may be approximately equal to a length 202 (FIG. 5B) of bushing 148. As used in the previous context only, the term "approximately" means±—10% of the associated value. Length 202 of bushing 148 is measured between first end 172 and second end 174 of bushing 148. Making the severed central portion 194 of fastener body 176 approximately equal in length to bushing 148 increases the probability that bushing 148 and end 146 of left riser 136b will release from housing 142.

In various embodiments, fastener body 176 may be formed having a reduced thickness in first and second regions 190, 192. For example, a thickness T of fastener body 176 in central portion 194 may be greater than as a thickness T1 of fastener body 176 in first and second regions 190, 192. Thickness T and thickness T1 are measured between an interior surface 210 of fastener body 176 and an exterior surface 212 of fastener body 176. Interior surface 210 may define chamber 180. Exterior surface 212 is oriented away from interior surface 210. Exterior surface 212 may define threads configured to engage nut 178. In various embodiments, the reduced thickness T1 in first region 190 may be created by a first groove 214 formed in fastener body 176. The reduced thickness T1 in second region 192 may be created by a second groove 216 formed in fastener body 176. First and second grooves 214, 216 may be formed in at least one of exterior surface 212 and/or interior surface 210. Length 200 of central portion 194 may be measured between first groove 214 and second groove 216.

In various embodiments, a type of material in first and second regions 190, 192 may be different from the type of material in central portion 194 (e.g. a weaker material may be used in first and second regions 190, 192, as compared to central portion 194). The material in first region 190 may be the same or different from the material in second region 192. In various embodiments, a density of the material in first and second regions 190, 192 may be less than a density of the material in central portion 194. The density of the material in first region 190 may be the same or different from the density of the material in second region 192.

Figure 5A:
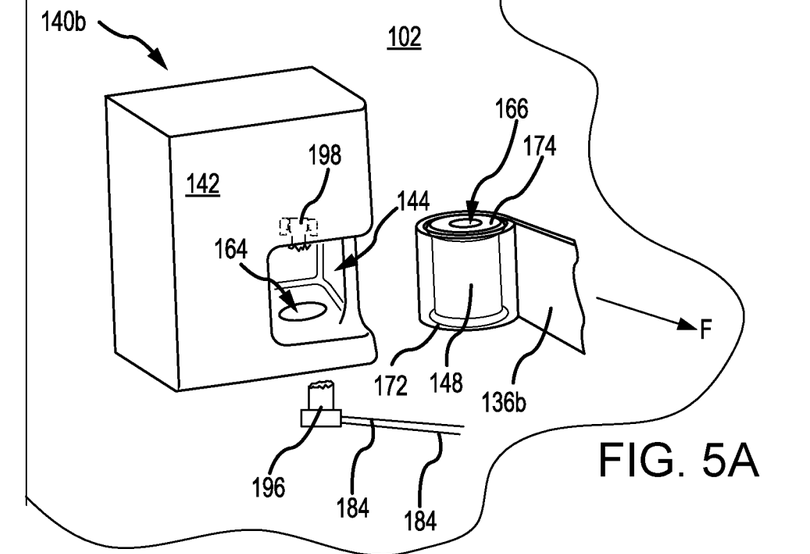
FIGS. 5A and 5B illustrate a perspective view and a cross-section view, respectively, of a drogue bridle separation assembly after detonation of the pyrotechnic fastener, in accordance with various embodiments.
Figure 5B:
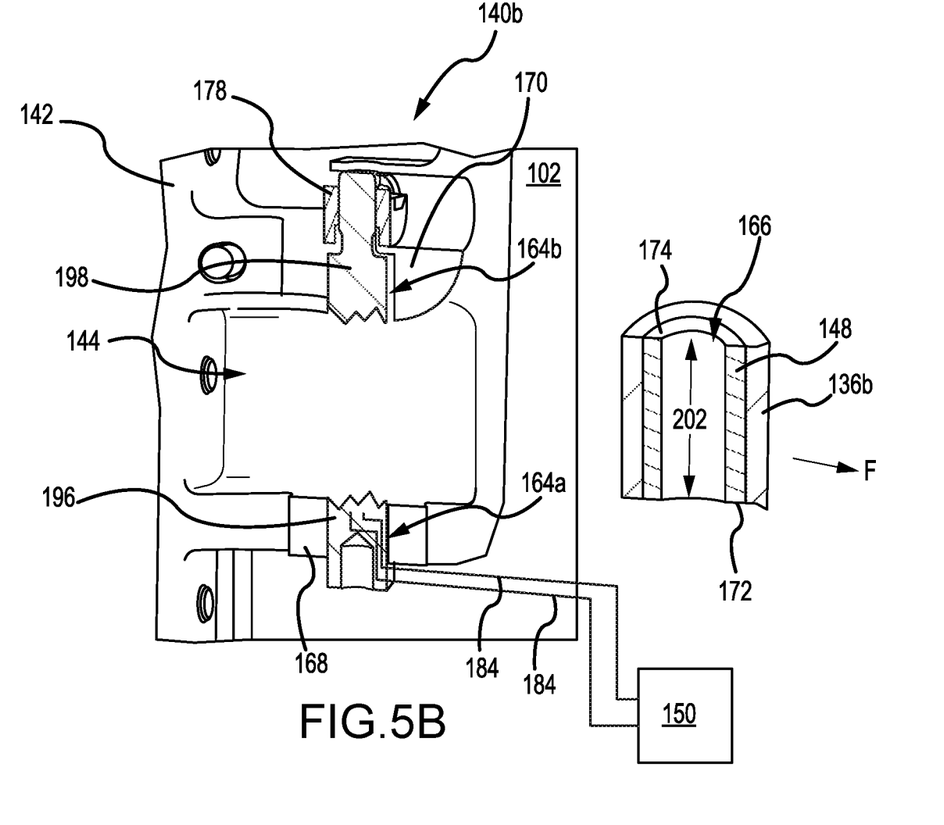

With reference to FIGS. 5A and 5B, left riser 136b is shown after detonation of pyrotechnic fastener 162. Detonation of charge 182, with momentary reference to FIG. 4, separates central portion 194 of fastener body 176 from first and second end portions 196, 198 of fastener body 176. The force F exerted by drogue canopy 32 (FIG. 1) pulls left riser 136b away from seatback 102, which causes bushing 148 and end 146 of left riser 136b to translate out of riser channel 144 and away from housing 142. Stated differently, detonation of charge 182 (FIG. 4) and separation of central portion 194 from first and second end portions 196, 198 releases (or decouples) left riser 136b from housing 142 and ejection seat 14.

In accordance with various embodiment, pyrotechnic fastener 162 is capable of releasing the left riser 136b from ejection seat 14 regardless of the type of material of left riser 136b. In this regard, right and left drogue bridle separation assemblies 140a, 140b having pyrotechnic fasteners 162 may be employed in ejection seats where a severance cutter may not be certified to cut the material of the riser. Employing pyrotechnic fasteners 162, as opposed to a bridle severance cutter, may allow for fewer certification and/or ejection seat testing operations. Further, employing pyrotechnic fastener 162 and eliminating the bridle severance cutter tends to allow for a simplified housing 142, which tends to decrease the time and costs associate with manufacturing housing 142 and/or install drogue parachute 30.

Figure 6:
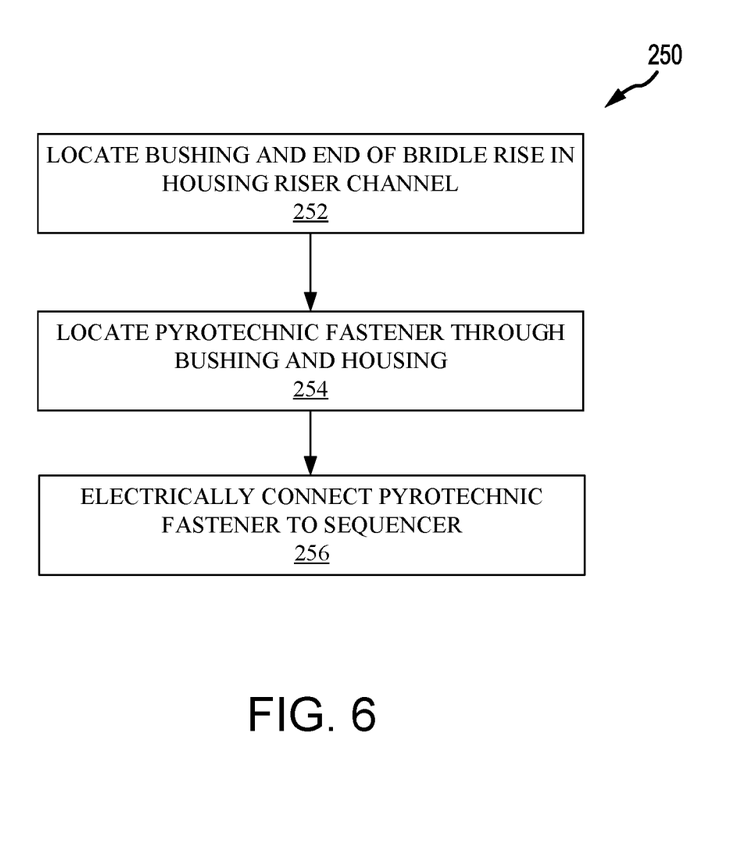
FIG. 6 illustrates a method of installing a drogue parachute in an ejection seat, in accordance with various embodiments.

With reference to FIG. 6, a method 250 for installing a drogue parachute in an ejection seat is illustrated. In accordance with various embodiments, method 250 may comprise locating a bushing coupled to an end of a drogue bridle riser in a riser channel defined by a housing (step 252). The housing may be coupled to a seatback of the ejection seat. Method 250 may further include locating a pyrotechnic fastener through the bushing and the housing (step 254) and electrically connecting the pyrotechnic fastener to a sequencer of the ejection seat (step 256).

With combined reference to FIG. 6 and FIG. 3B, step 252 may include locating bushing 248 and end 246 of left riser 136b in riser channel 144 of housing 142. Step 254 may include locating pyrotechnic fastener 162 through fastener channel 166 in bushing 148 and through first and second fastener openings 164a, 164b in housing 142. In this regard, pyrotechnic fastener 162 couples bushing 148 and left riser 136b to housing 142. Step 256 may include electrically connecting lead wires 184 to pyrotechnic fastener 162 and sequencer 150.

In various embodiments, method 250 may further comprise configuring sequencer 150 to send a first signal to deploy the drogue parachute 30 (FIG. 2) and to send a second signal to pyrotechnic fastener 162 a predetermined number of seconds after sending the first signal to drogue parachute 30.

With combined reference to FIG. 6 and FIG. 4, in various embodiments, method 250 further comprises configuring fastener body 176 to sever in first region 190 and in second region 192. A first length 200 of fastener body 176 between first region 190 and second region 192 is approximately equal to second length 202 (FIG. 5B) of bushing 148.

In various embodiments, configuring fastener body 176 to sever in first region 190 comprises forming first groove 214 in at least one of exterior surface 212 or interior surface 210 in first region 190. In various embodiments, configuring fastener body 176 to sever in second region 192 comprises forming second groove 216 in at least one of exterior surface 212 or interior surface 210 in second region 192.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A drogue bridle separation assembly, comprising:
a housing defining a riser channel and a fastener opening; and
a pyrotechnic fastener configured to extend through the fastener opening and the riser channel, the pyrotechnic fastener including a charge configured to undergo an exothermic reaction in response to an electrical signal, wherein the pyrotechnic fastener includes a fastener body, wherein the fastener body defines a chamber configured to receive gas produced by the exothermic reaction, wherein the pyrotechnic fastener is configured to sever in a first region of the fastener body and in a second region of the fastener body in response to the exothermic reaction;
a bushing configured to be received in the riser channel, wherein the bushing defines a fastener channel configured to receive the pyrotechnic fastener, wherein the first region corresponds to a first end of the bushing, wherein the second region corresponds to a second end of the bushing, and wherein a first length of a central portion of the fastener body is approximately equal to a second length of the bushing, the first length of the central portion of the fastener body measured between the first region and the second region, the second length of the bushing measured between a first end of the bushing and a second end of the bushing.

2. The drogue bridle separation assembly of claim 1, wherein the first region includes a first groove formed in at least one of an exterior surface of the fastener body or an interior surface of the fastener body, and wherein the second region includes a second groove formed in at least one of the exterior surface or the interior surface.

3. The drogue bridle separation assembly of claim 1, wherein the first region of the fastener body is formed of a first material, and wherein the central portion of the fastener body is formed of a second material different from the first material, and wherein the second region is formed of a third material different from the second material.

4. The drogue bridle separation assembly of claim 1, wherein the first region of the fastener body comprises a first density, and wherein the central portion of the fastener body comprises a second density, wherein the first density is less than the second density, wherein the second region comprises a third density, and wherein the third density is less than the second density.

5. An ejection seat, comprising:
a seatback;
a drogue canopy stowed, at least partially, in an interior of the seatback;
a bridle riser coupled to the drogue canopy and the seatback;
a housing coupled to the seatback and defining a riser channel and a fastener opening
a pyrotechnic fastener configured to extend through the fastener opening and the riser channel, the pyrotechnic fastener including a charge configured to undergo an exothermic reaction in response to an electrical signal, wherein the pyrotechnic fastener includes a fastener body, wherein the fastener body defines a chamber configured to receive gas produced by the exothermic reaction, wherein the pyrotechnic fastener is configured to sever in a first region of the fastener body and in a second region of the fastener body in response to the exothermic reaction; and
a bushing located in a loop formed by an end of the bridle riser, wherein the bushing is configured to be received in the riser channel, wherein the bushing defines a fastener channel configured to receive the pyrotechnic fastener, wherein the first region corresponds to a first end of the bushing, wherein the second region corresponds to a second end of the bushing, and wherein a first length of a central portion of the fastener body is approximately equal to a second length of the bushing, the first length of the central portion of the fastener body measured between the first region and the second region, the second length of the bushing measured between a first end of the bushing and a second end of the bushing.

6. The ejection seat of claim 5, further comprising a sequencer configured to send the electrical signal to the pyrotechnic fastener.

7. The ejection seat of claim 5, wherein the first region includes a first groove formed in at least one of an exterior surface of the fastener body or an interior surface of the fastener body, and wherein the second region includes a second groove formed in at least one of the exterior surface or the interior surface.

8. A method for installing a drogue parachute in an ejection seat, comprising:
locating a bushing coupled to an end of a drogue bridle riser in a riser channel defined by a housing, the housing coupled to a seatback of the ejection seat;
locating a pyrotechnic fastener through the bushing and the housing;
electrically connecting the pyrotechnic fastener to a sequencer of the ejection seat; and
configuring a fastener body of the pyrotechnic fastener to sever in a first region and in a second region, wherein a first length of the fastener body between the first region and the second region is approximately equal to a second length of the bushing, the second length of the bushing measured between a first end of the bushing and a second end of the bushing.

9. The method of claim 8, further comprising:
configuring the sequencer to send a first signal to deploy the drogue parachute; and
configuring the sequencer to send a second signal to the pyrotechnic fastener a predetermined number of seconds after sending the first signal.

10. The method of claim 8, wherein configuring the fastener body to sever in the first region and in the second region comprises:
forming a first groove in at least one of an exterior surface of the fastener body or an interior surface of the fastener body in the first region; and
forming a second groove in at least one of the exterior surface of the fastener body or the interior surface of the fastener body in the second region.

* * * * *